United States Patent
Sharifi et al.

(10) Patent No.: US 9,275,136 B1
(45) Date of Patent: Mar. 1, 2016

(54) METHOD FOR SIREN DETECTION BASED ON AUDIO SAMPLES

(71) Applicant: Google Inc., Mountain View, CA (US)

(72) Inventors: Matthew Sharifi, Mountain View, CA (US); Dominick Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 14/095,199

(22) Filed: Dec. 3, 2013

(51) Int. Cl.
G08G 1/00 (2006.01)
G06F 17/30 (2006.01)
H04R 29/00 (2006.01)

(52) U.S. Cl.
CPC .......... G06F 17/30743 (2013.01); H04R 29/00 (2013.01)

(58) Field of Classification Search
CPC ........................ G06F 17/30743; H04R 29/00
USPC ..................... 340/901–904; 381/86
See application file for complete search history.

(56) References Cited

U.S. PATENT DOCUMENTS

| | | | | |
|---|---|---|---|---|
| 4,380,004 A * | 4/1983 | Coats | ..................... | G08B 21/04 340/902 |
| 4,759,069 A * | 7/1988 | Bernstein | ................. | G08B 1/08 324/76.31 |
| 4,952,931 A * | 8/1990 | Serageldin | .......... | G08G 1/0965 340/901 |
| 5,495,242 A | 2/1996 | Kick et al. | | |
| 7,675,431 B1 | 3/2010 | Caouette, Sr. | | |
| 8,194,865 B2 | 6/2012 | Goldstein et al. | | |
| 2004/0233067 A1 | 11/2004 | Cho | | |
| 2005/0041819 A1* | 2/2005 | Brown | ................... | B60Q 9/008 381/86 |
| 2008/0001780 A1* | 1/2008 | Ohno | ................... | G08G 1/0962 340/904 |
| 2013/0049985 A1* | 2/2013 | Eisenson | ............. | G08G 1/0965 340/902 |
| 2013/0070928 A1* | 3/2013 | Ellis | ....................... | H04R 25/30 381/56 |
| 2015/0063575 A1* | 3/2015 | Tan | ................... | G06F 17/30743 381/56 |

FOREIGN PATENT DOCUMENTS

WO 9931637 A1 6/1999
WO 2012097150 A1 7/2012

* cited by examiner

*Primary Examiner* — Daniel Wu
(74) *Attorney, Agent, or Firm* — McDonnell Boehnen Hulbert and Berghoff LLP

(57) ABSTRACT

The present disclosure provides methods and apparatuses that enable an apparatus to identify sounds from short samples of audio. The apparatus may capture an audio sample and create several audio signals of different lengths, each containing audio from the captured audio sample. The apparatus my process the several audio signals in an attempt to identify features of the audio signal that indicate an identification of the captured sound. Because shorter audio samples can be analyzed more quickly, the system may first process the shortest audio samples in order to quickly identify features of the audio signal. Because longer audio samples contain more information, the system may be able to more accurately identify features in the audio signal in longer audio samples. However, analyzing longer audio signals takes more buffered audio than identifying features in shorter signals. Therefore, the present system attempts to identify features in the shortest audio signals first.

20 Claims, 5 Drawing Sheets

METHOD FOR SIREN DETECTION BASED ON AUDIO SAMPLES

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that enable an apparatus to identify sounds from short samples of audio. In some embodiments, the apparatus may capture an audio sample and create several audio signals of different lengths, each containing audio from the captured audio sample. The apparatus my process the several audio signals in an attempt to identify features of the audio signal that indicate an identification of the captured sound. Because shorter audio samples can be analyzed more quickly, in one example, the system may first process the shortest audio samples in order to quickly identify features of the audio signal. The system may then process the longer audio samples. Because longer audio samples contain more information, the system may be able to more accurately identify features in the audio signal in longer audio samples. However, analyzing longer audio signals may require more buffered audio than identifying features in shorter signals. Therefore, in some embodiments the present system attempts to identify features in audio signals quickly. Although the disclosure generally describes the apparatuses and methods with respect to an autonomous vehicle, both also can also be used with other devices, such as wearable computing devices, mobile devices (e.g., cellular phones), and other devices that may benefit from the ability to detect audio signals.

An apparatus disclosed herein includes an audio unit configured to receive an audio signal. The apparatus may also include a processing unit and a control system. The processing unit may process the audio signal from the audio unit to create a plurality of windowed audio samples including at least a first windowed audio sample and a second windowed audio sample. The first windowed audio sample and the second windowed audio sample may each have a different length of time. The processing unit may also determine a likelihood that the first windowed audio sample includes a siren signal based on a detection of a group of features of the first windowed audio signal with a siren-classification profile. The group of features includes the mel-frequency cepstrum coefficients (MFCCs) associated with a reference siren signal, a monotonicity estimation associated with the reference siren signal, and spectral energy concentration estimation associated with the reference siren signal. The processor may also, based on the first windowed audio sample indicating a likelihood of a siren signal below a threshold, determine a likelihood that the second windowed audio sample includes a siren signal. The processor may determine the likelihood based a detection of a group of features of the second windowed audio signal with a siren-classification profile. The group of features includes the mel-frequency cepstrum coefficients (MFCCs) associated with the reference siren signal, a monotonicity estimation associated with the reference siren signal, and a spectral energy concentration estimation associated with the reference siren signal. Additionally, the processing system may alter the control of the apparatus by the control system based on the likelihood of at least one of the first windowed audio sample and the second windowed audio sample including a siren signal being above the threshold.

A method disclosed herein includes receiving an audio signal with an audio unit. The method also includes processing, with a processor, the audio signal from the audio unit to create a plurality of windowed audio samples. The plurality of windowed audio samples includes at least a first windowed audio sample and a second windowed audio sample. In some embodiments, the first windowed audio sample and the second windowed audio sample each have a different length of time. Additionally, the method includes determining a likelihood that the first windowed audio sample includes a siren signal based on a detection of a group of features of the first windowed audio signal with a siren-classification profile. The group of features includes the mel-frequency cepstrum coefficients (MFCCs) associated with a reference siren signal, a monotonicity estimation associated with the reference siren signal, and a spectral energy concentration estimation associated with the reference siren signal. The method also includes, based on the first windowed audio sample indicating a likelihood of a siren signal below a threshold, determining a likelihood that the second windowed audio sample includes a siren signal. The determining the likelihood may be based a detection of a group of features of the second windowed audio signal with a siren-classification profile. The group of features includes the mel-frequency cepstrum coefficients (MFCCs) associated with the reference siren signal, a monotonicity estimation associated with the reference siren signal, and a spectral energy concentration estimation associated with the reference siren signal. Additionally, the method includes providing instructions to control an apparatus based on the likelihood of at least one of the first windowed audio sample and the second windowed audio sample including a siren signal being above the threshold.

An article of manufacture is disclosed herein, including a non-transitory computer-readable medium having stored thereon program instructions that, if executed by a processor in a vehicle system, causes the vehicle system to perform operations. The operations also include processing the audio signal from the audio unit to create a plurality of windowed audio samples. The plurality of windowed audio samples includes at least a first windowed audio sample and a second windowed audio sample. In some embodiments, the first windowed audio sample and the second windowed audio sample each have a different length of time. Additionally, the operations include determining a likelihood that the first windowed audio sample includes a siren signal based on a detection of a group of features of the first windowed audio signal with a siren-classification profile. The group of features includes the mel-frequency cepstrum coefficients (MFCCs) associated with a reference siren signal, a monotonicity estimation associated with the reference siren signal, and a spectral energy concentration estimation associated with the reference siren signal. The operations also include, based on the first windowed audio sample indicating a likelihood of a siren signal below a threshold, determining a likelihood that the second windowed audio sample includes a siren signal. The determining the likelihood may be based a detection of a group of features of the second windowed audio signal with a siren-classification profile. The group of features includes the mel-frequency cepstrum coefficients (MFCCs) associated with a reference siren signal, a monotonicity estimation associated with the reference siren signal, and a spectral energy concentration estimation associated with the reference siren signal. Additionally, the operations include providing instructions to control an apparatus based on the likelihood of at least one of the first windowed audio sample and the second windowed audio sample including a siren signal being above the threshold.

An apparatus disclosed herein includes a means for receiving an audio signal with an audio unit and means for operating the apparatus. The vehicle may also includes means for processing the audio signal from the audio unit to create a plurality of windowed audio samples including at least a first windowed audio sample and a second windowed audio sample. The first windowed audio sample and the second windowed audio sample may each have a different length of time. The means for processing may also determine a likelihood that the first windowed audio sample includes a siren signal, based on a detection of a group of features of the first windowed audio signal with a siren-classification profile. The group of features includes the mel-frequency cepstrum coefficients (MFCCs) associated with a reference siren signal, a monotonicity estimation associated with the reference siren signal, and a spectral energy concentration estimation associated with the reference siren signal. The means for processing may also, based on the first windowed audio sample indicating a likelihood of a siren signal below a threshold, determine a likelihood that the second windowed audio sample includes a siren signal. The means for processing may determine the likelihood based a detection of a group of features of the second windowed audio signal with a siren-classification profile. The group of features includes the mel-frequency cepstrum coefficients (MFCCs) associated with the reference siren signal, a monotonicity estimation associated with the reference siren signal, and a spectral energy concentration estimation associated with the reference siren signal. Additionally, the means for processing may provide instructions to control an apparatus based on the likelihood of at least one of the first windowed audio sample and the second windowed audio sample including a siren signal being above the threshold.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
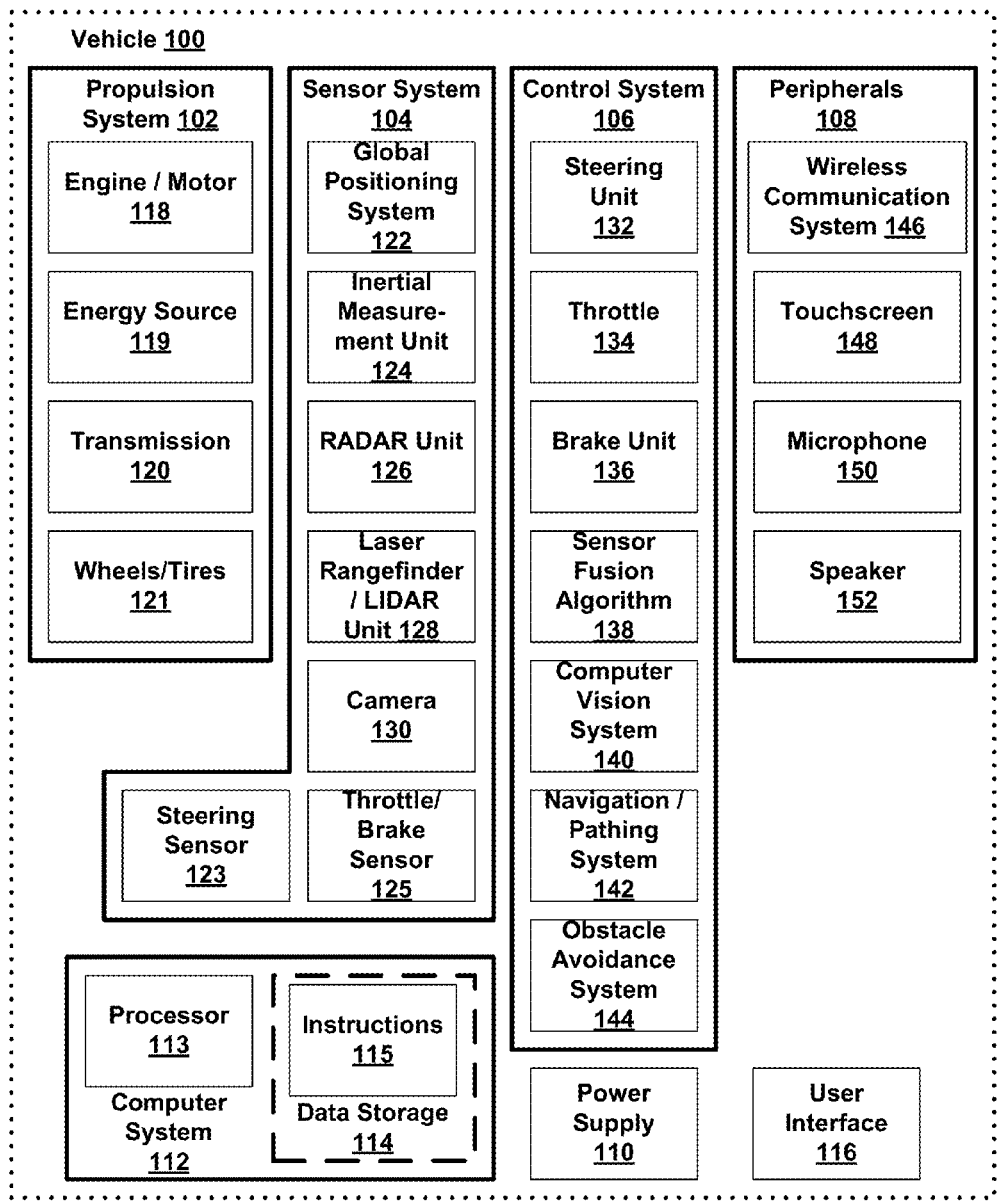
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

The present disclosure includes a method for detecting features, such as a siren (or other emergency vehicle) sounds, in a captured audio signal in the presence of background noise. By capturing audio data and windowing the audio data over different overlapping chunks of time, features may be extracted from the audio data based on the different windowed audio samples. A classifier, operating with a classification profile, can detect features of the different windowed audio samples to detect audio of a desired feature, such as a siren, despite noise in the audio signal. One method of detecting sirens is based on training features and a classifier using collected training data. A second method is based on using audio fingerprints of known sounds, such as sirens. Audio fingerprints may provide extremely good performance when encountering captured audio signals that are very similar sirens to the known set.

An embodiment includes a classifier-based method for detecting audio features. As part of the classifier-based method, sound may be received by a microphone in the autonomous vehicle as a continuous stream of audio samples with a very low latency. The received sound may be windowed over different amounts of time to create overlapping audio samples of varied amounts of time. In one example, four different windows may be used to create audio samples of 0.5 second (s), 1 s, 2.5 s and 5 s. The classifier may calculate a score each of the windowed audio samples, based on a classification profile of the desired audio feature. The higher the score, the more likely the respective audio sample includes the desired audio feature signal. The accuracy of detection may increase as the window length increases; however, the longer window time may also introduce a longer audio latency. Therefore, a quick analysis may be performed on the shorter audio samples and a more robust analysis may be performed on the longer audio samples. The sliding windows may enable the detection of a desired audio signal, such as a siren, within one second for many examples, but in noisy environments with lower signal/noise ratio the method can fall back on the longer length detection windows. Additionally, the classifier may be used to quickly identify features, such as possible sirens, in the received audio signal. In one embodiment, the classifier may not indicate the presence of a desired feature and may responsively enable a more robust, but slower, siren identification processor. The presently disclosed classifier-based method may enable detection of desired audio features more quickly.

One example siren detection method may include a linear classifier. The linear classifier may operate (and be trained) based on at least the following four features. The classifier may calculate the means of mel-frequency cepstrum coefficients (MFCCs) of each captured windowed audio signal. The MFCCs are parameters that capture the spectral shape of the windowed audio signals. Additionally, the classifier may calculate the standard deviations of MFCC coefficients. The classifier may also estimate the monotonicity and estimate the spectral energy concentration estimation of the captured audio.

In this example siren detection method, a classifier running on a processor in the autonomous vehicle will analyze features of the widowed captured audio, such as the four features previously discussed, to determine whether or not a siren signal is present in received audio. In various embodiments, the data that enables the classifier to detect features of the windowed audio signals may have one of several different sources. First, the classifier data may be preprogrammed to the autonomous vehicle. A set of data may be programmed to the memory of the vehicle during production. The set of data may be periodically updated to provide better classification.

Second, the classifier may be adapted based on audio signals received by a respective autonomous vehicle. For example, if a classifier erroneously indicates the presence (or absence) of a siren, a human may provide an input indicating the error. The classifier may be able to adapt the detection based on the input. In the third embodiment, the classifier may receive data from the internet. A computer server may be able to communicate updated data to the autonomous vehicle. The classifier, to increase the reliability of the classifier detecting audio features, may use the data communicated to the autonomous vehicle from the computer server. For example, in some instances an autonomous vehicle may send audio clips to an internet server for analysis. The internet server may analyze the audio clip and possibly determine a new set of classifier parameters (e.g., a new classification profile). These new parameters may be communicated to one or more autonomous vehicles to update the classifier currently operating on the vehicle.

In other embodiments, the audio system may not record continuously. The audio signal may be recorded periodically, so that any speech, music, or other audio would not be intelligible as recorded. For example, the audio system may record 0.5 s of audio and wait a period of time, such as one second, before recording another 0.5 s audio sample. Therefore, a siren signal could be detected without the system being able to record a conversation.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. While in autonomous mode, the vehicle 100 may be configured to operate without human interaction. For example, a computer system could control the vehicle 100 while in the autonomous mode, and may be operable to operate the vehicle an autonomous mode. As part of operating in the autonomous mode, the vehicle may identify features of sounds of the environment around the vehicle. If one or more of the identified features indicates the presence of an emergency vehicle siren, the computer system may alter the control of the autonomous vehicle.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
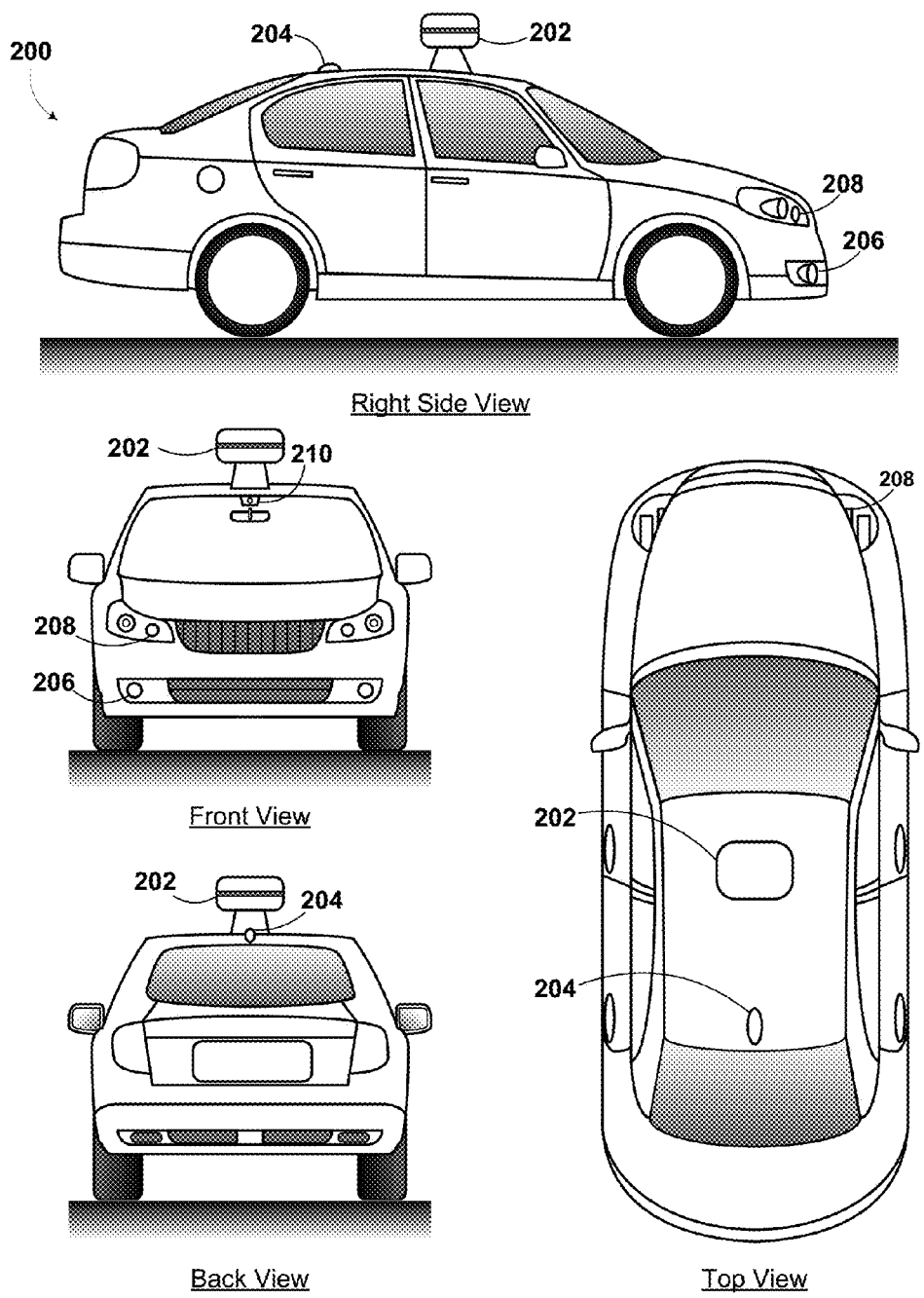
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3:
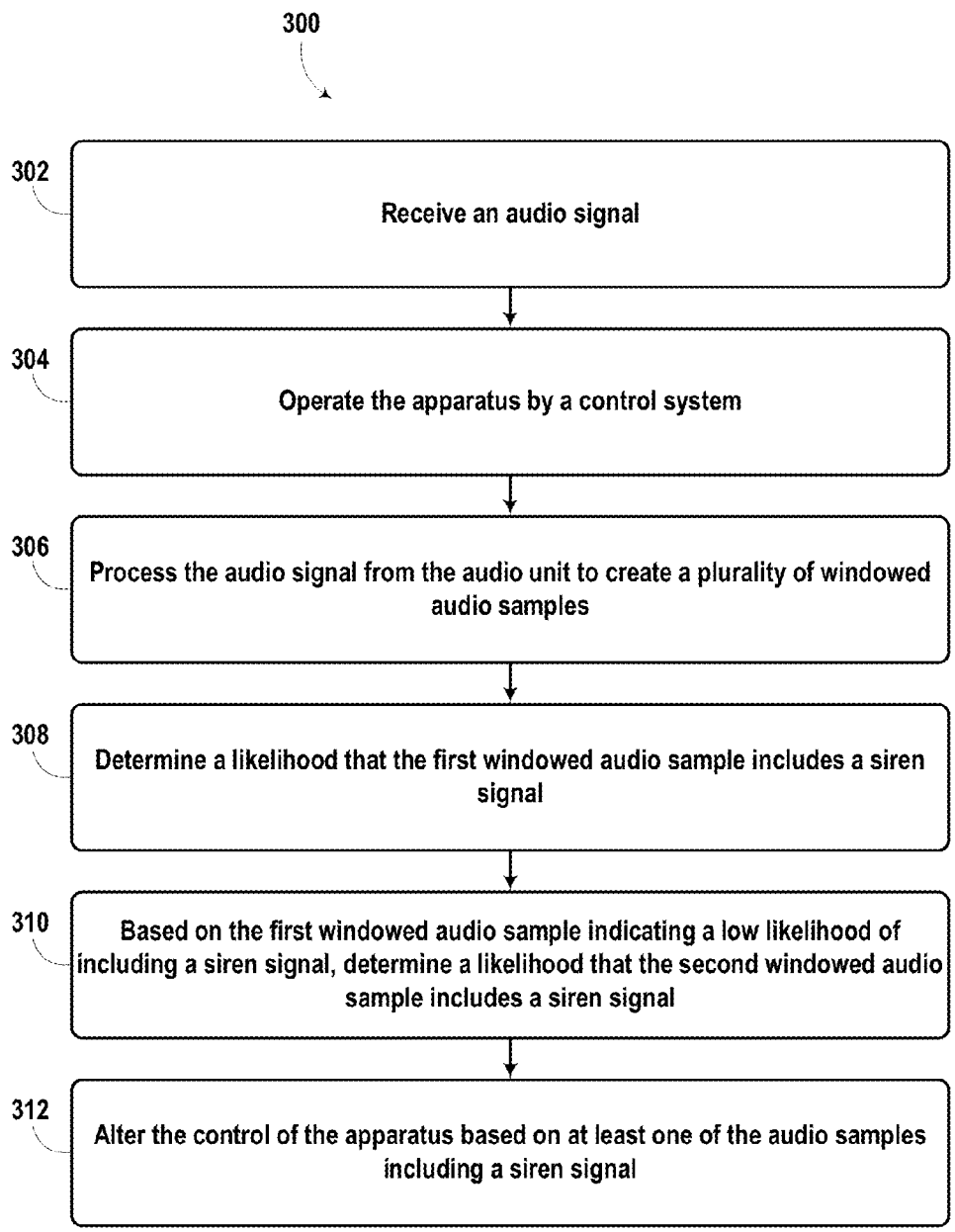
FIG. 3 shows a method, according to an example embodiment.

A method 300 is provided for enabling a system to more quickly detect audio signals in an environment of an autonomous vehicle by creating audio samples of varying length of time. The detected audio signals may include siren audio, sounds of other vehicles, audio of pedestrians, and other audio signals. The method could be performed using any of the apparatus shown in FIGS. 1-2 and FIGS. 4-5 and described herein; however, other configurations could be used as well. FIG. 3 illustrates the blocks in an example method. However, it is understood that in other embodiments, the blocks may appear in different order and blocks could be added, subtracted, or modified. Additionally, the blocks may be performed in a linear manner (as shown) or may be performed in a parallel manner (not shown).

Block 302 includes the vehicle receiving an audio signal from an environment in which the vehicle operates. In various embodiments, the vehicle may receive an audio signal from the environment in which the vehicle operates in a variety of ways. A sensor system on the autonomous vehicle may include a microphone configured to provide an audio signal captured from the environment. The sensors may communicate data to a processor in the vehicle about information each sensor receives.

In an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be configured to identify that the captured audio signal is indicative of an emergency vehicle. In another example, the microphone may capture the sound of an exhaust of anther vehicle, such as that from a motorcycle. The processing system may be able to identify that the captured audio signal is indicative of a motorcycle. The data captured by the microphone may form a portion of the data indicating an environment.

In one embodiment, the audio system of vehicle may record the audio captured by the microphone. The audio captured by the microphone may be stored in a memory similar to a cache. The captured audio may be stored only temporarily for processing with the methods and systems described herein. After the audio has been processed, it may be removed from the memory of the vehicle. Therefore, in some embodiments, the vehicle may not store audio information, other than the temporary storage for processing disclosed herein.

Block 304 includes a control system operating the vehicle. In some instances, block 304 may be performed while block 302 is being performed. Block 304 includes the vehicle operating in an autonomous mode. While operating in the autonomous mode, the vehicle may use a computer system to control the operation of the vehicle with little-to-no human input. For example, a human-operator may enter an address into an autonomous vehicle and the vehicle may then be able to drive, without further input from the human (e.g., the human does not have to steer or touch the brake/gas pedals), to the specified destination.

While the vehicle is operating autonomously, the sensor system may be receiving an audio signal from the environment of the vehicle, as disclosed with respect to block 302. The processing system of the vehicle may alter the control of the vehicle based on data received from the various sensors. In some examples, the autonomous vehicle may alter a velocity of the autonomous vehicle in response to data from the various sensors. The autonomous vehicle may change velocity in order to avoid obstacles, obey traffic laws, etc. When a processing system in the vehicle identifies objects near the autonomous vehicle, the vehicle may be able to change velocity, or alter the movement in another way.

Block 306 includes the vehicle processing the audio signal from the audio unit to create a plurality of audio samples. The plurality of audio samples includes audio samples of varying lengths. As the audio unit receives audio, the received audio may be stored as audio samples of different lengths based on the length of time for the audio windows. Additionally, each respective audio length of time for the audio windows may have multiple samples stored as time progresses.

For example, in one embodiment, there may be two audio windows, one of 0.5 s and another of 2 s. As audio is received by the audio unit, two samples may be stored, one of 0.5 s and another of 2 s. After an amount of time equal to the respective sample length, the audio unit may stop storing data for the respective window and start storing a new sample. Therefore, the audio unit may create several audio samples at the same time, and as time progresses, by starting and stopping recording the various audio samples based on the length of time of the respective audio window. Another example of processing the audio signal from the audio unit to create a plurality of audio samples is disclosed with respect to FIG. 4. Further, blocks 302, 304 and 306 may each be performed concurrently.

In another embodiment, the audio system may not record continuously. The audio signal may be recorded periodically, so that any speech, music, or other audio would not be intelligible as recorded. For example, when the microphone captures an audio signal, the audio system may record half a second of audio and wait a period of time, such as one second, before recording another half a second audio sample. Therefore, a siren signal could be detected without the system being able to record a conversation.

In yet a further embodiment, the audio system may simultaneously record several audio signals based on the various audio windows for processing by the classifier. In one example, four different windows may be used to create audio sample of 0.5 second (s), 1 s, 2.5 s, and 5 s. The audio system may store an audio signal captured by the microphone for each of the respective window lengths. Thus, the audio system may only store audio signals in lengths equivalent to those of the various windows.

As previously stated, there is often a trade-off that can be made between the precision of the system (how accurately audio features are recognized) and the speed of the system (how quickly a feature can be recognized). The present disclosure includes a system first analyzes short audio samples to try and identify features and falls back to longer audio samples for more accuracy. Thus, the system will generally operate to quickly identify audio features. For example, in some embodiments, even when the vehicle has a low confidence of a detected object, it may alter a movement of the autonomous vehicle in order to make sure the vehicle is operated safely. Therefore, the system may capture several audio samples of varying lengths.

Block 308 includes the vehicle determining a likelihood that the first windowed audio sample includes a desired audio feature, such as a siren signal. The likelihood may be determined in a variety of different ways depending on the specific embodiment. In one embodiment, the processing system of the vehicle may include a classifier configured to measure various features of an audio sample. Based on the measured various features of the audio sample, the classifier may calculate a score for the respective audio signal, based on a classification profile. The higher the score, the more likely that the respective audio sample includes the desired audio feature. Additionally, various classification profiles may be used to detect various features, such as a siren-classification profile.

A classifier of the processing system may be configured to detect features of the different windowed audio samples to detect a desired feature, such as a siren, despite noise in the audio signal. One method of detecting sirens is based on training features and a classifier using collected training data. The second method is based on using audio fingerprints of known sirens. Audio fingerprints may provide accurate recognizing of audio features, when encountering captured audio signals that are very similar sirens to the known set. In some embodiments, the processing system may use both the classifier-based detection method and the fingerprint-based method to detect desired audio features of a captured sample.

As part of the classifier-based method, the classifier may analyze various sounds captured by the audio system of the vehicle. In some embodiments, it may be desirable for the system to identify features of the captured audio with a low latency (e.g., identify features quickly). The captured audio may have been windowed over different amounts of time to create overlapping audio samples of varied amounts of time. In one example, four different windows may be used to create audio sample of 0.5 second (s), 1 s, 2.5 s and 5 s. At block 308, the classifier may operate on the audio samples with a shorter length of time. By first operating on the short audio samples, desired features may be identified more quickly than if longer audio samples were analyzed first.

The classifier may operate by calculating a score each of the windowed audio samples with the short length of time. The classifier may calculate a score for each audio sample created with the short window time as the audio system stores the sample. Additionally, the system may delete the audio sample (e.g., no longer store the audio sample) after the classifier creates a score for the respective sample. The higher the score, the more likely the respective audio sample includes the desirable audio feature. The sliding windows may enable the detection of a desired audio signal, such as a siren, within one second for many examples, but in noisy environments with lower signal/noise ratio the method can fall back on the longer length detection windows. Additionally, the classifier may be used to quickly identify possible audio feature in the received audio signal. The presently disclosed classifier may enable detection more quickly be having the classifier first operate on the short audio samples.

One example siren detection method may include a linear classifier. A linear classifier may be able to make a determination about whether the desired audio feature is present in an audio signal based on a linear combination of audio features. The linear classifier may operate based on at least the following four features. The classifier may calculate the means of mel-frequency cepstrum coefficients (MFCCs) of each captured windowed audio signal. The MFCCs are parameters that capture the spectral shape of the windowed audio signals. Additionally, the classifier may calculate the standard deviations of MFCC coefficients. The classifier may also estimate the monotonicity and estimate the spectral energy concentration estimation of the captured audio.

The MFCC is a representation of an audio signal based on the short-term power spectrum of the sound. The MFCC is based on a discrete cosine transform of a log power spectrum on a nonlinear mel scale of frequency spectrum. An MFCC may be calculated by: (i) calculating the Fourier transform of the windowed audio sample; (ii) mapping the powers of the spectrum obtained above onto the mel scale; (iii) calculating the logarithm of the powers at each of the mel frequencies; and (iv) calculating the discrete cosine transform of the list of mel logarithm powers. The MFCC are the amplitudes of the spectrum that result from (iv). The classifier may use the MFCC to determine if an audio sample contains the desired feature. Additionally, the classifier may calculate the standard deviation of the MFCC. The standard deviation of the MFCC may be another feature the linear classifier uses when classifying an audio signal.

Additionally, in one specific embodiment, the audio system may receive S seconds of mono input signal sampled at 8 Kilohertz (KHz), where the length of time is greater than or equal to 0.5 s. The system may then compute MFCC 2-11 coefficients using a 64 millisecond (ms) long sliding window and 32 ms step. Using the above-computed coefficients, the system may compute two feature vectors: (i) a vector of mean MFCC coefficients and (ii) a vector of the standard deviations of MFCC coefficients. The i-th element of the mean vector contains the arithmetic mean of the i-th MFCC coefficient across all slices in the window; the i-th element of the standard deviation vector contains the sample standard deviation of the i-th MFCC coefficient across all slices in the window. The classifier may use the two feature vectors in its determination.

The classifier may also estimate the monotonicity of the captured audio signal. The monotonicity is a determination of whether the frequency components of an audio signal are changing. For example, a tone may have a very high monotonicity, while a sweep may have a low monotonicity.

The monotonicity calculation is based on the observation that emergency vehicle siren sound typically possesses the following properties. The sound of the siren is salient with a fundamental frequency is in range 1 KHz-3 KHz. The sound of the siren also has strong higher harmonics, all higher harmonic at least up to 8 KHz are saliently present. Additionally, the sound of the siren is a monotonic sound (the monotonicity is evident in both the fundamental frequency and its higher harmonics). The pitch of the siren sound is often periodically rising and falling, the modulation frequency is typically lower than 10 Hertz (Hz).

In one embodiment, the classifier may measure the monotonicity of the sound using the following method. Receive a least half a second of audio sampled at 8 KHz. Compute a spectrogram using FFT, where FFT window length is 4 ms and and step length is 0.5 ms. Correct spectral tilt by multiplying each spectrogram row with the zero-based row index. Keep only spectrogram rows that correspond to frequencies higher than 1250 Hz. Normalize each spectrogram slice (which is a vector) by using the following formula: normalized_slice=(slice−mean(slice))/L2((slice−mean(slice)), where mean is arithmetic mean, and L2 is Euclidean norm. Compute correlation of each spectrogram slice with the slice that immediately precedes the slice. The monotonicity estimation is computed as arithmetic mean of all correlation values computed above.

In one example of computation of the monotonicity, the system computes the spectrogram and compares it, slice by slice, to its copy shifted by 0.5 ms. The frequency resolution of the spectrogram must be low to be robust to low frequency modulations of the pitch. If in average, at every instant the spectrogram, the slice looks very similar to the slice 0.5 ms away, than the system can detect that that the spectrogram is not changing much across the whole frequency spectrum and that the sound is monotonic. This method essentially measures the monotonicity of sound over the whole frequency spectrum of interest, that is 1250 Hz to 4 KHz if using 8 KHz sampling rate.

The classifier may also estimate the spectral energy concentration estimation of the captured audio. The spectral energy concentration is a measurement of the power delivered by the audio signal with respect to the various frequency components of the audio signal. Both the monotonicity of the captured audio signal and the spectral energy concentration of the captured audio signal may be used by the classifier to determine if the captured audio signal has the desired features.

In one embodiment, the classifier may also measure the energy concentration of the samples sound in a spectrogram using the following method. Receive at least half a second of audio sampled at 8 KHz. Compute a spectrogram using FFT, where FFT window length is 64 ms and step length is 32 ms. Correct spectral tilt and overweight the higher frequencies by multiplying each spectrogram row with the zero-based row index to the power of 1.6. In each spectrogram slice, select the 14 top elements. In each spectrogram slice count how many pairs of these top elements are adjacent to each other; that is, how many pairs of top elements are in adjacent frequency bins. The spectral energy concentration estimation is the average count of adjacent top elements in a slice.

In this example siren detection method, a classifier running on a processor in the autonomous vehicle will analyze features of the widowed captured audio, such as the four features previously discussed, to determine whether or not a siren signal is present in received audio. Other types of classifiers, such as non-linear classifiers may be used as well. Some non-linear classifiers include quadratic classifiers, neural networks, and many other types. The disclosed methods and apparatuses may operate with the various types of classifiers.

In various embodiments, the data that the classifier uses to detect features of the windowed audio signals, the classification profile, may have one of several different sources. First, the classifier data may be preprogrammed to the autonomous vehicle. For example, a set of data may be programmed to the memory of the vehicle during production. Additionally, the set of data may be periodically updated to provide better classification. Second, the classifier may be adapted based on audio signals received by a respective autonomous vehicle. For example, if a classifier erroneously indicates the presence (or absence) of a siren, a human may provide an input indicating the error. The classifier may be able to adapt the detection based on the input. In the third embodiment, the classifier may receive data from the internet. A computer server may be able to communicate updated data to the autonomous vehicle. The classifier, to increase the reliability of the classifier detecting audio features, may use the data communicated to the autonomous vehicle from the computer server. For example, in some instances an autonomous vehicle may send audio clips to an internet server for analysis. The internet server may analyze the audio clip and possibly determine a new set of classifier parameters. These new parameters may be communicated to one or more autonomous vehicles to update the classifier currently operating on the vehicle.

Block 310 the vehicle, based on the first window sample (e.g., block 308) indicating a low likelihood of including the desired signal, determining a likelihood that a second windowed audio sample includes a desired audio feature, such as a siren signal. The second widowed audio signal will have a different length of time than the first windows audio signal. Additionally, the second widowed audio signal may also overlap with the first windowed audio signal (e.g., the second windowed audio signal may include audio corresponding to the first audio signal, and some additional audio). Thus, in some embodiments, block 310 may be used to provide a more accurate evaluation of the presence (or lack thereof) of a desired audio signal in a sample. Because block 310 is performed on a longer audio sample than block 308, its likelihood calculation may be more accurate.

Block 310 may perform the same methods and classification (and/or fingerprint) based detection as block 308, but on a second windowed audio signal. In some embodiments, block 310 may be performed if based on the first window sample (e.g., block 308) indicating a high likelihood of including the desired signal. In this embodiment, block 310 may act as a confirmation of the likelihood determined at block 308.

Additionally, in some embodiments, block 310 may be repeated for a plurality of windowed audio samples. For example, if the audio system captures audio samples windowed with four different window lengths, block 310 may be repeated for some or all of the different window lengths. In one embodiment, block 308 is performed on the shortest audio sample, if no signal is present in the shortest audio sample, the next longest sample is analyzed by the processing system at block 310. Block 310 may be repeated for each different window length, increasing the length of the window with each iteration.

Block 312 includes the vehicle altering the control of the apparatus by the control system based on at least one of the audio samples including a desired signal, such as a siren signal. When the vehicle receives the likelihood indicating that an audio sample includes a desired signal, the likelihood may be communicated to the control system of the vehicle. Based on the likelihood, the vehicle may alter the control of the vehicle. The control of the vehicle may be altered based on the likelihood indicating that an audio sample includes a desired signal. Additionally, the control of the vehicle may be adjusted based on the type of the desired signal as well. For example, a siren signal may indicate to a vehicle to slow down and pull to the side of a road. However, a signal indicating a person is trying to hail a cab may indicate that the vehicle should stop and allow a pedestrian to enter the vehicle.

In some examples, the likelihood indicating that an audio sample includes a desired signal may indicate the presence of a feature that the autonomous vehicle was not aware of before it received the audio data. In another embodiment, the likelihood indicating that an audio sample includes a desired signal may indicate that a feature is different from how the processing system classified the feature (e.g., a false pedestrian signal may really have been a siren signal). In yet a further embodiment, the likelihood indicating that an audio sample includes a desired signal may indicate a feature of the audio identified by the autonomous vehicle was not actually present in the environment (e.g., a false positive). Therefore, to continue safe operation of the autonomous vehicle, the control of the vehicle may be altered based on the likelihood indicating that an audio sample includes a desired signal.

For example, altering the movement of the vehicle may include stopping the vehicle, switching the vehicle to a human-controlled mode, changing a velocity of vehicle (e.g., a speed and/or direction), or other movement alteration.

Figure 4:
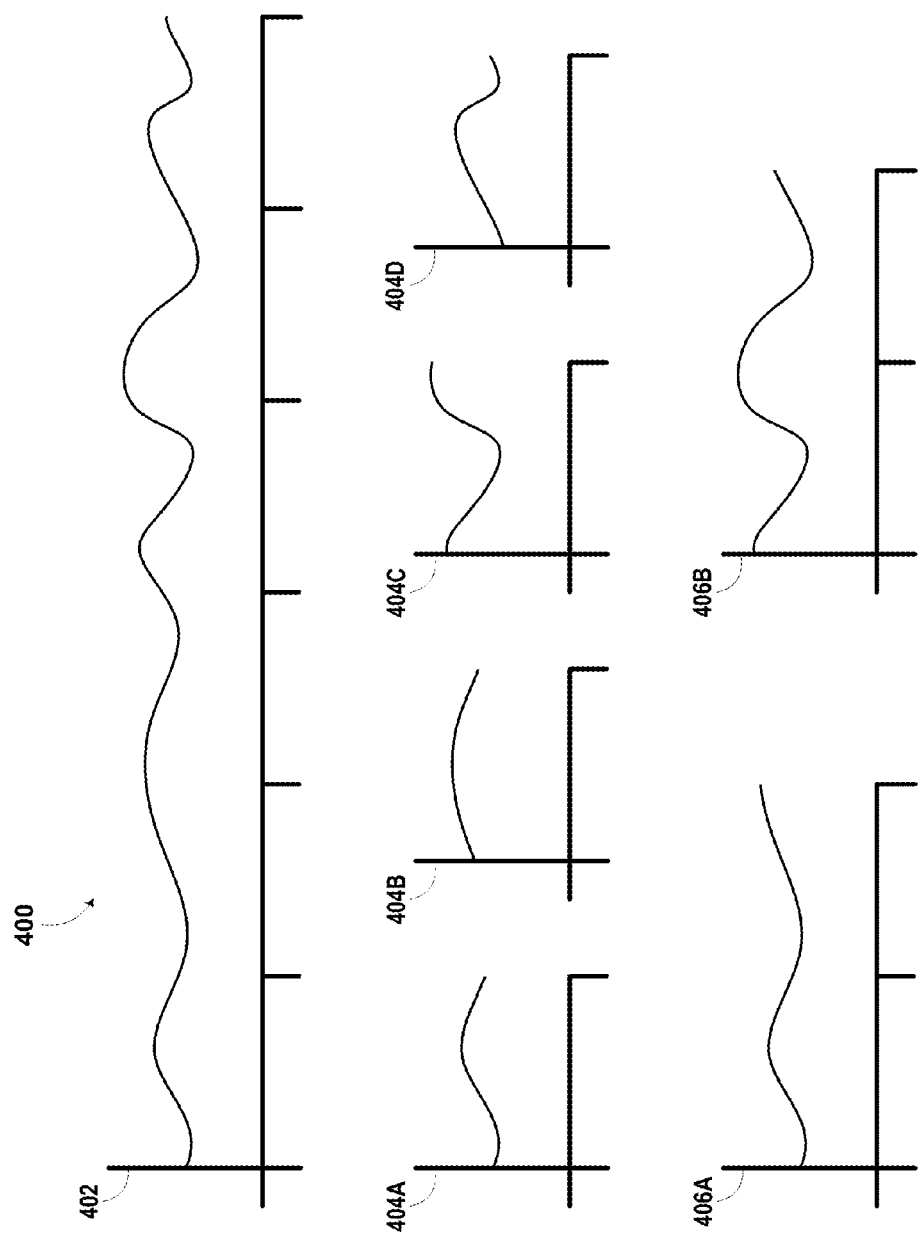
FIG. 4 is an example of an audio signal.

FIG. 4 illustrates an example of scenario 400 involving an audio sample 402 being windowed into a first set of samples 404A-404D and a second set of samples 406A and 406B. FIG. 4 only shows the audio sample 402 being windowed with a first and second window; however, the audio sample may be windowed by more windows in other embodiments that are not shown. During the operation of the autonomous vehicle, the vehicle may be able to record sound of the environment around the vehicle. For example, a vehicle may have a microphone located outside of the vehicle configured to record ambient sound as the vehicle is in operation. In some embodiments, the vehicle may continuously record audio as it operates. However, in other embodiments, the vehicle may only periodically record audio. By recording audio periodically, the vehicle may capture enough audio to identify a feature of the audio, such as a siren, but not enough audio to record a conversion.

To form audio sample 402, the vehicle may capture audio. A shown in FIG. 4, audio sample 402 represents an example of three seconds of audio captured by the vehicle. The processing system of the vehicle may apply several windowing filters to the audio sample 402 to create many windowed audio samples. In some embodiments, the filter may be a sliding filter. In other embodiments, the filter may be a static filter that just creates a sample of a specified length of time.

The first set of samples 404A-404D corresponds to a 0.5 second window sampling the audio sample 402. The second set of samples 406A and 406B corresponds to a one second window sampling the audio sample 402. Samples from the first set of samples 404A-404D may overlap with the samples from the second set of samples 406A and 406B. As shown in FIG. 4, sample 404A may correspond to the first 0.5 second of the audio sample 402. Sample 406A may correspond to the first one second of audio sample 402. Therefore, audio samples 404A and 406A may overlap and contain some of the same audio data.

In some embodiments, audio signal 402 is not recorded at all. Audio signal 402 may simply be received with a microphone in the vehicle and directly sampled. In this embodiment, to create windowed samples, the processing system may capture a pre-defined length of audio for each respective window length. As shown in FIG. 4, samples 404A-404D represent 0.5 seconds worth of audio captured from the audio signal 402. Additionally, samples 406A-406B represent one second worth of audio captured from the audio signal 402. As shown in FIG. 4, the audio samples 404A-404D and 406A-406B are not continuous samples of the audio signal 402. Once a first sample of a specific length of time is captured, the system may wait a period of time before capturing the next respective signal of the same amount of time. Thus, the information captured in audio samples 404A-404D and 406A-406B contains gaps in the audio so the full sound of the environment of the vehicle may not be recreated.

It will be understood that there are other similar methods that could describe receiving data representative of an electromagnetic signal, receiving an indication of a movement of the vehicle, determining a movement parameter based the indication of the movement of the vehicle, and recovering the distance and direction information from the electromagnetic signal, based on the movement parameter. Those similar methods are implicitly contemplated herein.

Figure 5:
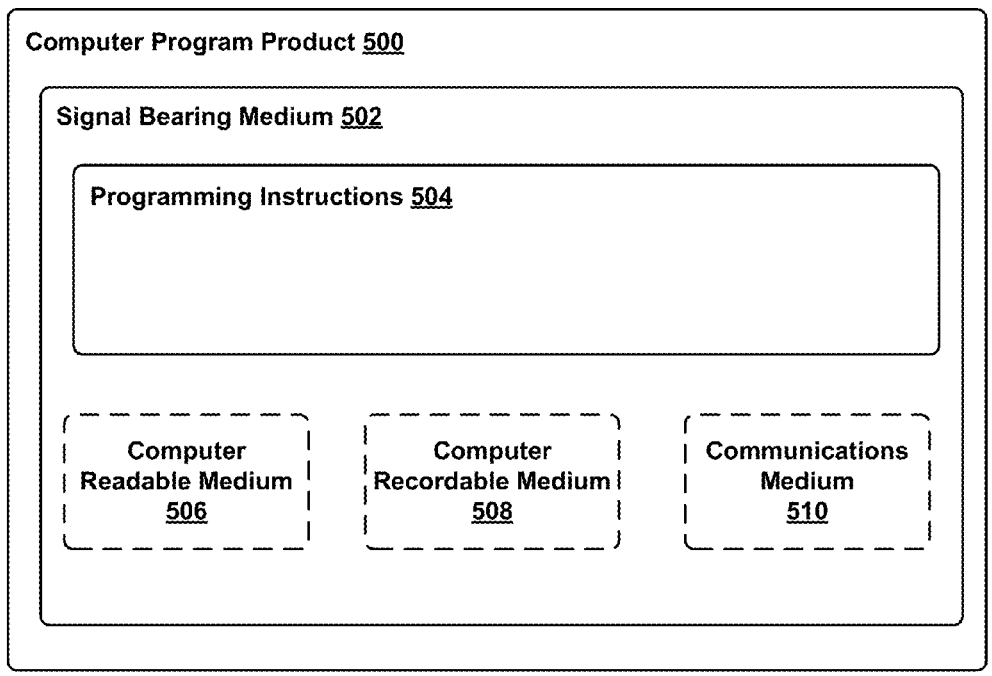
FIG. 5 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. An apparatus comprising:
   an audio unit configured to receive an audio signal;
   a control unit configured to operate the apparatus; and
   a processing unit configured to:
   process the audio signal from the audio unit to create a plurality of windowed audio samples including at least a first windowed audio sample and a second windowed audio sample, wherein the first windowed audio sample and the second windowed audio sample each have a different length of time;

determine a likelihood that the first windowed audio sample comprises a siren signal based on a detection of a group of features in the first windowed audio signal associated with a siren-classification profile, wherein the group of features comprises mel-frequency cepstrum coefficients (MFCCs) associated with a reference siren signal;

based on the first windowed audio sample indicating a likelihood of a siren signal below a threshold, determine a likelihood that the second windowed audio sample includes a siren signal based a detection of a group of features of the second windowed audio signal with the siren-classification profile, wherein the group of features comprises the mel-frequency cepstrum coefficients (MFCCs) associated with the reference siren signal; and alter control of the apparatus by the control system based on the likelihood of at least one of the first windowed audio sample and the second windowed audio sample including a siren signal being above the threshold.

2. The apparatus according to claim 1, wherein the processor is further configured to determine the likelihood using a linear classifier analyzing the group of features of a respective audio signal and wherein each group of features further comprises a monotonicity estimation associated with the reference siren signal, and a spectral energy concentration estimation associated with the reference siren signal.

3. The apparatus according to claim 1, wherein the audio unit is configured to periodically receive the audio signal.

4. The apparatus of claim 1, wherein the processor is further configured to:

determine a fingerprint-based likelihood that the first windowed audio sample comprises a siren signal based on a comparison of the first windowed audio signal with a group of audio fingerprints, wherein the group of audio fingerprints comprises at least one audio fingerprint of a siren signal;

based on the first windowed audio sample indicating a fingerprint-based likelihood of a siren signal below the threshold, determine a fingerprint-based likelihood that the second windowed audio sample comprises a siren signal based on a comparison of the second windowed audio signal with the group of audio fingerprints.

5. The apparatus of claim 1, further comprising a communication unit, wherein the communication unit is configured to receive the siren-classification profile from a remote system.

6. The apparatus of claim 1, further comprising an input device, wherein the input device is configured to receive an input, wherein the input comprises an override indication to provide an indication of a false siren detection.

7. The apparatus of claim 6, wherein the processor is further configured to adjust the siren-classification profile based on the input device receiving the override indication.

8. A method comprising:

receiving an audio signal with an audio unit;

processing, with a processor, the audio signal from the audio unit to create a plurality of windowed audio samples including at least a first windowed audio sample and a second windowed audio sample, wherein the first windowed audio sample and the second windowed audio sample each have a different length of time;

determining a likelihood that the first windowed audio sample comprises a siren signal based on the detection of a group of features of the first windowed audio signal, wherein the group of features comprises the mel-frequency cepstrum coefficients (MFCCs) associated with a reference siren signal;

based on the first windowed audio sample indicating a likelihood of the first windowed audio sample including a siren signal below a threshold, determining a likelihood that the second windowed audio sample comprises a siren signal based on the detection of a group of features of the second windowed audio signal, wherein the group of features comprises the mel-frequency cepstrum coefficients (MFCCs) associated with the reference siren signal; and providing instructions to control an apparatus based on the likelihood of at least one of the first windowed audio sample and the second windowed audio sample including a siren signal being above the threshold.

9. The method according to claim 8, wherein determining a likelihood comprises a linear classifier analyzing the group of features of a respective audio signal and wherein each group of features further comprises a monotonicity estimation associated with the reference siren signal, and a spectral energy concentration estimation associated with the reference siren signal.

10. The method according to claim 8, wherein receiving an audio signal with an audio unit comprises periodically receiving the audio signal.

11. The method of claim 8, further comprising:

determining a fingerprint-based likelihood that the first windowed audio sample comprises a siren signal based on a comparison of the first windowed audio signal with a group of audio fingerprints, wherein the group of audio fingerprints comprises at least one audio fingerprint of a siren signal;

based on first windowed audio sample indicating a fingerprint-based likelihood of a siren signal below the threshold, determining a fingerprint-based likelihood that the second windowed audio sample comprises a siren signal based on a comparison of the second windowed audio signal with the group of audio fingerprints.

12. The method of claim 8, further comprising receiving the siren-classification profile from a remote system.

13. The method of claim 8, further comprising receiving an input, wherein the input comprises an override indication to provide an indication of a false siren detection.

14. The method of claim 13, further comprising adjusting the siren-classification profile based on the input device receiving the override indication.

15. An article of manufacture including a non-transitory computer-readable medium having stored thereon instructions that, when executed by a processor in a vehicle system, cause the vehicle system to perform operations comprising:

receiving an audio signal;

processing the audio signal to create a plurality of windowed audio samples including at least a first windowed audio sample and a second windowed audio sample, wherein the first windowed audio sample and the second windowed audio sample each have a different length of time;

determining a likelihood that the first windowed audio sample comprises a siren signal based on the detection of a group of features of the first windowed audio signal, wherein the group of features comprises the mel-frequency cepstrum coefficients (MFCCs) associated with a reference siren signal;

based on the first windowed audio sample indicating a low likelihood of the first windowed audio sample including a siren signal, determining a likelihood that the second windowed audio sample comprises a siren signal based on the detection of a group of features of the second windowed audio signal, wherein the group of features comprises the mel-frequency cepstrum coefficients (MFCCs) associated with a reference siren signal; and providing instructions to control an apparatus based on the likelihood of at least one of the first windowed audio sample and the second windowed audio sample including a siren signal being above the threshold.

16. The article of manufacture according to claim 15, wherein determining a likelihood comprises a linear classifier analyzing the group of features of a respective audio signal and wherein each group of features further comprises a monotonicity estimation associated with the reference siren signal, and a spectral energy concentration estimation associated with the reference siren signal.

17. The article of manufacture of claim 15, further comprising:

determining a fingerprint-based likelihood that the first windowed audio sample comprises a siren signal based on a comparison of the first windowed audio signal with a group of audio fingerprints, wherein the group of audio fingerprints comprises at least one audio fingerprint of a siren signal;

based on first windowed audio sample indicating a fingerprint-based likelihood of a siren signal below the threshold, determining a fingerprint-based likelihood that the second windowed audio sample comprises a siren signal based on a comparison of the second windowed audio signal with the group of audio fingerprints.

18. The article of manufacture of claim 15, further comprising receiving the siren-classification profile from a remote system.

19. The article of manufacture of claim 15, further comprising receiving an input, wherein the input comprises an override indication to provide an indication of a false siren detection.

20. The article of manufacture of claim 19, further comprising adjusting the siren-classification profile based on the input device receiving an override indication.

* * * * *